United States Patent
Lu et al.

(10) Patent No.: US 12,428,947 B2
(45) Date of Patent: Sep. 30, 2025

(54) WELLHEAD FATIGUE DAMAGE ESTIMATION USING METOCEAN DATA

(71) Applicant: Chevron U.S.A. Inc., San Ramon, CA (US)

(72) Inventors: Wangming Lu, Katy, TX (US); William Stephen Averill, Cypress, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 18/619,615

(22) Filed: Mar. 28, 2024

(65) Prior Publication Data
US 2024/0328300 A1   Oct. 3, 2024

Related U.S. Application Data

(60) Provisional application No. 63/493,502, filed on Mar. 31, 2023.

(51) Int. Cl.
*E21B 47/001* (2012.01)
*E21B 33/035* (2006.01)
*G01M 13/00* (2019.01)

(52) U.S. Cl.
CPC .......... *E21B 47/001* (2020.05); *E21B 33/035* (2013.01); *G01M 13/00* (2013.01)

(58) Field of Classification Search
CPC ..... E21B 47/001; E21B 33/035; G01M 13/00
See application file for complete search history.

(56) References Cited

U.S. PATENT DOCUMENTS

| | | | |
|---|---|---|---|
| 7,194,913 B2 | 3/2007 | Morrison | |
| 8,074,720 B2 | 12/2011 | Radi | |
| 8,725,429 B2 | 5/2014 | Mcneill | |
| 9,416,652 B2 * | 8/2016 | Plotnikov | E21B 47/12 |
| 9,593,568 B1 | 3/2017 | Lemonds | |
| 10,968,731 B2 | 4/2021 | Gupta | |
| 11,261,722 B2 | 3/2022 | Cain | |
| 11,499,413 B2 * | 11/2022 | Lu | G06N 3/047 |
| 2014/0374113 A1 | 12/2014 | Kebadze | |
| 2014/0374116 A1 | 12/2014 | Kelso | |

(Continued)

FOREIGN PATENT DOCUMENTS

NO    20150828    6/2015

OTHER PUBLICATIONS

A New Quantitative Assessment of Current Profile Clustering Methods for Riser Engineering—OMAE2015-41429, V001T01A006.

(Continued)

*Primary Examiner* — Aaron L Lembo
(74) *Attorney, Agent, or Firm* — Esplin & Associates, PC

(57) ABSTRACT

The wave characteristics of the water (e.g., ocean) above a wellhead may be used to determine a wave-induced wellhead fatigue damage rate for the wellhead, and the current profile of water around a riser connected to the wellhead may be used to determine a riser vortex-induced vibration caused fatigue damage rate for the wellhead. The wave-induced wellhead fatigue damage rate and the riser vortex-induced vibration caused fatigue damage rate for the wellhead may be combined to obtain the total wellhead fatigue damage rate for the wellhead, which may be used to make operational decisions, such as connections or disconnections, for the well.

20 Claims, 6 Drawing Sheets

(56) References Cited

U.S. PATENT DOCUMENTS

| | | | |
|---|---|---|---|
| 2015/0176237 A1 | 6/2015 | Li | |
| 2015/0177099 A1* | 6/2015 | Hamilton | F16C 19/527 |
| | | | 702/34 |
| 2016/0237804 A1 | 8/2016 | Papadimitriou | |
| 2018/0095455 A1 | 4/2018 | Silva | |
| 2018/0283221 A1* | 10/2018 | Reigl | G05B 23/0283 |
| 2018/0320502 A1 | 11/2018 | Turner | |
| 2021/0115780 A1 | 4/2021 | Hyland | |
| 2021/0180418 A1* | 6/2021 | Sun | E21B 21/08 |
| 2024/0068356 A1* | 2/2024 | Lu | E21B 47/007 |
| 2024/0084692 A1 | 3/2024 | Guan | |
| 2024/0211656 A1* | 6/2024 | Su | E21B 47/007 |
| 2024/0427968 A1* | 12/2024 | Ma | G06F 30/27 |

OTHER PUBLICATIONS

An extreme value prediction method based on clustering algorithm—Reliability Engineering & System Saety, vol. 222, Jun. 2022, 108442.

Introducing multi-round clustering on capturing the multidirectional extreme current profile for deep-water ROV operation—Ocean Engineering vol. 233, Aug. 1, 2021, 109205.

Li, J.C., 'Probability Prediction Approach of Fatigue Failure for the Subsea Wellhead Using Bayesian Regularization Artificial Neural Network', Journal of Marine Science and Engineering, 2022, No. 11, vol. 10, p. 1627, https://www.mdpi.com/2077-1312/10/11/1627, Nov. 2, 2022. (19 pages).

Trivedi S., 'The Utility of Clustering in Prediction Tasks', arXiv preprint arXiv: 1509.06163, https://arxiv.org/abs/1509.06163, Sep. 21, 2015. (11 pages).

Wiener, N., 'Extrapolation, Interpolation, and Smoothing of Stationary Time Series: With Engineering Applications', ISBN-10 0262730057, The MIT Press, https://direct.mit.edu/books/oa-monograph/4361/Extrapolation-Interpolation-and-Smoothing-of, Feb. 1964. (177 pages).

Zhang, Z et al., 'Efficient Multiscale Gaussian Process Regression using Hierarchical Clustering', arXiv preprint arXiv: 1511.02258 version 1, https://arxiv.org/abs/1511.02258v1, Nov. 6, 2015. (20 pages).

* cited by examiner

500

| Significant wave height in meters (Hs) | Peak wave period in seconds (Tp) | | | | | | | | |
|---|---|---|---|---|---|---|---|---|---|
| | 0-2 | 2-4 | 4-6 | 6-8 | 8-10 | 10-12 | 12-14 | 14-16 | 16+ |
| 0-0.5 | # | # | | | | | | | |
| 0.5-1 | | # | # | # | # | # | | | |
| 1-1.5 | | | # | # | # | # | # | # | # |
| 1.5-2 | | | # | # | # | # | # | # | # |
| 2-2.5 | | | | # | # | # | # | # | # |
| 2.5-3 | | | | # | # | # | # | # | |

FIG. 5

WELLHEAD FATIGUE DAMAGE ESTIMATION USING METOCEAN DATA

CROSS-REFERENCE TO RELATED APPLICATIONS

The present application claims the benefit of U.S. Provisional Application No. 63/493,502, entitled "SYSTEMS AND METHODS FOR SUBSEA WELLHEAD FATIGUE PREDICTION," which was filed on: Mar. 31, 2023, the entirety of which is hereby incorporated herein by reference.

FIELD

The present disclosure relates generally to the field of estimating wellhead fatigue damage using metocean data.

BACKGROUND

Operation of an underwater well (e.g., subsea well) may result in wellhead fatigue damage. Inaccurate estimation of wellhead fatigue damage accumulation may result in under-use or overuse of the wellhead. Accurate estimation of wellhead fatigue damage accumulation is required to make informed decisions on future operations of the underwater well.

SUMMARY

This disclosure relates to estimating wellhead fatigue damage using metocean data. Metocean information and/or other information may be obtained. The metocean information may characterize metocean conditions for a wellhead. A wave-induced wellhead fatigue damage rate for the wellhead may be determined based on the metocean conditions for the wellhead and/or other information. A riser vortex-induced vibration caused wellhead fatigue damage rate for the wellhead may be determined based on the metocean conditions for the wellhead and/or other information. A total wellhead fatigue damage rate for the wellhead may be determined based on the wave-induced wellhead fatigue damage rate, the riser vortex-induced vibration caused wellhead fatigue damage rate, and/or other information. One or more well operations may be facilitated based on the total wellhead fatigue damage rate for the wellhead and/or other information.

A system for estimating wellhead fatigue damage using metocean data may include one or more electronic storage, one or more processors and/or other components. The electronic storage may store information relating to a wellhead, information relating to a riser above the wellhead, metocean information, information relating to metocean conditions, information relating to wave-induced wellhead fatigue damage rates, information relating to riser vortex-induced vibration caused wellhead fatigue damage rates, information relating to total wellhead fatigue damage rates, information relating to well operations, and/or other information.

The processor(s) may be configured by machine-readable instructions. Executing the machine-readable instructions may cause the processor(s) to facilitate estimating wellhead fatigue damage using metocean data. The machine-readable instructions may include one or more computer program components. The computer program components may include one or more of a metocean component, a wave fatigue component, a riser vortex-induced vibration fatigue component, a total fatigue component, a well operation component, and/or other computer program components.

The metocean component may be configured to obtain metocean information and/or other information. The metocean information may characterize metocean conditions for a wellhead. In some implementations, the metocean conditions for the wellhead may include current profile for the wellhead and wave characteristics for the wellhead. In some implementations, the wave characteristics for the wellhead may include peak wave period and significant wave height for the wellhead. In some implementations, the metocean conditions for the wellhead may correspond to a time. The time corresponding to the metocean conditions for the wellhead may include a historical time, a present time, or a future time. In some implementations, the metocean conditions for the wellhead may be associated with probabilities.

The wave fatigue component may be configured to determine a wave-induced wellhead fatigue damage rate for the wellhead. The wave-induced wellhead fatigue damage rate for the wellhead may be determined based on the metocean conditions for the wellhead and/or other information. In some implementations, the wave-induced wellhead fatigue damage rate may be determined for a time corresponding to the metocean conditions for the wellhead.

In some implementations, a wave-induced fatigue analysis may be performed for the wellhead to predetermine values of the wave-induced wellhead fatigue damage rate for different sea states. The different sea states may be defined by different combinations of peak wave period and significant wave height. The wave-induced wellhead fatigue damage rate for the wellhead may be determined based on a two-dimensional interpolation of the predetermined values of the wave-induced wellhead fatigue damage rate for a given sea state.

The riser vortex-induced vibration fatigue component may be configured to determine a riser vortex-induced vibration caused wellhead fatigue damage rate for the wellhead. The riser vortex-induced vibration caused wellhead fatigue damage rate for the wellhead may be determined based on the metocean conditions for the wellhead and/or other information. In some implementations, the riser vortex-induced vibration caused wellhead fatigue damage rate may be determined for a time corresponding to the metocean conditions for the wellhead.

In some implementations, a modal analysis may be performed to predetermine natural frequencies and modal shapes of a riser connected to the wellhead. The riser vortex-induced vibration caused wellhead fatigue damage rate for the wellhead may be determined further based on the predetermined natural frequencies and the predetermined modal shapes of the riser connected to the wellhead. Use of the predetermined natural frequencies and the predetermined modal shapes of the riser connected to the wellhead to determine the riser vortex-induced vibration caused wellhead fatigue damage rate for the wellhead may reduce time and resources required to determine the riser vortex-induced vibration caused wellhead fatigue damage rate for the wellhead.

The total fatigue component may be configured to determine a total wellhead fatigue damage rate for the wellhead. The total wellhead fatigue damage rate for the wellhead may be determined based on the wave-induced wellhead fatigue damage rate, the riser vortex-induced vibration caused wellhead fatigue damage rate, and/or other information. In some implementations, the total wellhead fatigue damage rate determined for the wellhead may include a probabilistic total wellhead fatigue damage rate.

The well operation component may be configured to facilitate one or more well operations. The well operation(s)

may be facilitated based on the total wellhead fatigue damage rate for the wellhead and/or other information. In some implementations, the well operation(s) may be facilitated further based on an accumulated wellhead fatigue damage at the wellhead and an allowable fatigue damage limit for the wellhead. In some implementations, the allowable fatigue damage limit for the wellhead may include one or more operational fatigue limits for one or more operations or a total fatigue limit for the life cycle of the wellhead.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 5 illustrates an example look-up table for wave induced wellhead fatigue damage rate.

DETAILED DESCRIPTION

The present disclosure relates to estimating wellhead fatigue damage using metocean data. The wave characteristics of the water (e.g., ocean) above a wellhead may be used to determine a wave-induced wellhead fatigue damage rate for the wellhead, and the current profile of water around a riser connected to the wellhead may be used to determine a riser vortex-induced vibration caused fatigue damage rate for the wellhead. The wave-induced wellhead fatigue damage rate and the riser vortex-induced vibration caused fatigue damage rate for the wellhead may be combined to obtain the total wellhead fatigue damage rate for the wellhead, which may be used to make operational decisions, such as connections or disconnections, for the well.

Figure 1:
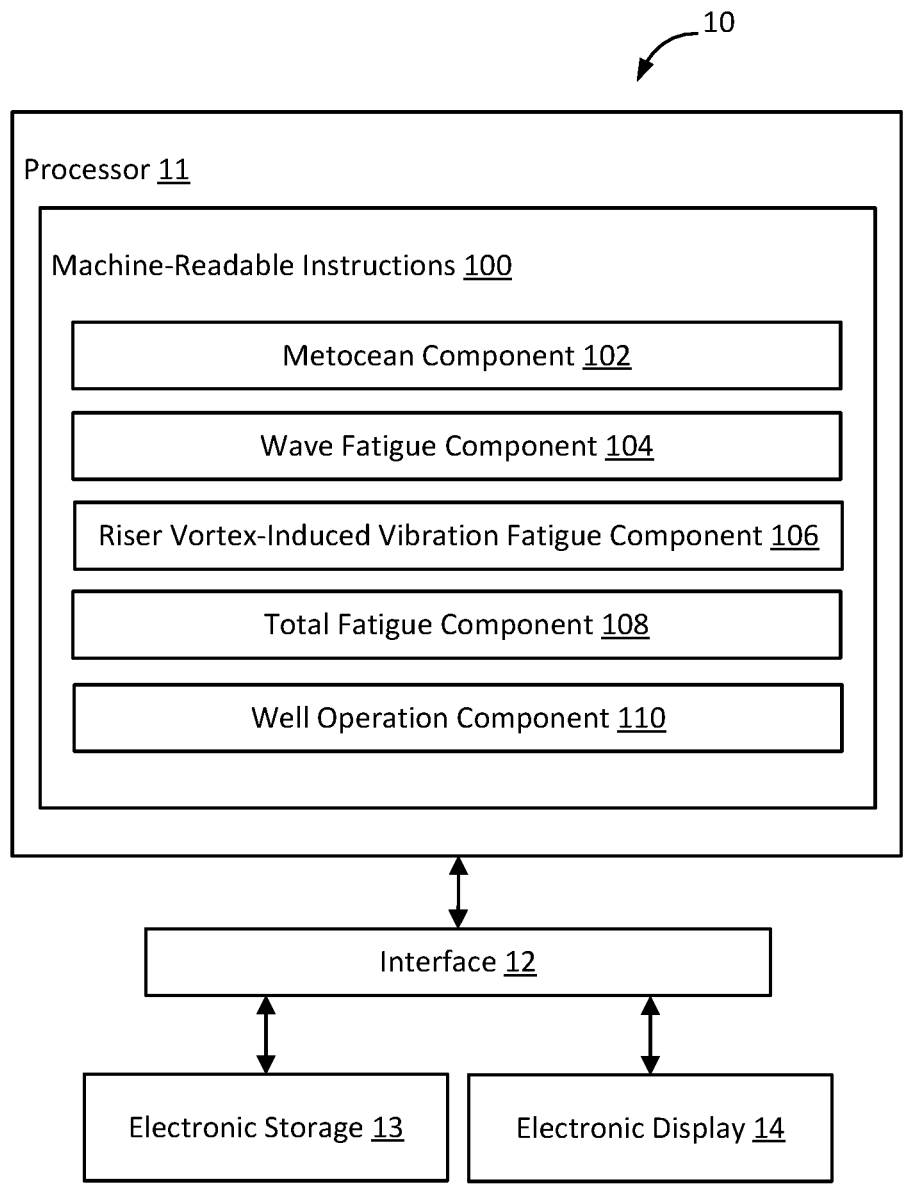
FIG. 1 illustrates an example system for estimating wellhead fatigue damage using metocean data.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, an electronic display 14, and/or other components. Metocean information and/or other information may be obtained by the processor 11. The metocean information may characterize metocean conditions for a wellhead. A wave-induced wellhead fatigue damage rate for the wellhead may be determined by the processor 11 based on the metocean conditions for the wellhead and/or other information. A riser vortex-induced vibration caused wellhead fatigue damage rate for the wellhead may be determined by the processor 11 based on the metocean conditions for the wellhead and/or other information. A total wellhead fatigue damage rate for the wellhead may be determined by the processor 11 based on the wave-induced wellhead fatigue damage rate, the riser vortex-induced vibration caused wellhead fatigue damage rate, and/or other information. One or more well operations may be facilitated by the processor 11 based on the total wellhead fatigue damage rate for the wellhead and/or other information.

The electronic storage 13 may be configured to include an electronic storage medium that electronically stores information. The electronic storage 13 may store software algorithms, information determined by the processor 11, information received remotely, and/or other information that enables the system 10 to function properly. For example, the electronic storage 13 may store information relating to a wellhead, information relating to a riser above the wellhead, metocean information, information relating to metocean conditions, information relating to wave-induced wellhead fatigue damage rates, information relating to riser vortex-induced vibration caused wellhead fatigue damage rates, information relating to total wellhead fatigue damage rates, information relating to well operations, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present information relating to a wellhead, information relating to a riser above the wellhead, metocean information, information relating to metocean conditions, information relating to wave-induced wellhead fatigue damage rates, information relating to riser vortex-induced vibration caused wellhead fatigue damage rates, information relating to total wellhead fatigue damage rates, information relating to well operations, and/or other information.

A well may refer to a hole or a tunnel in the ground. A well may be drilled in one or more directions. For example, a well may include a vertical well, a horizontal well, a deviated well, and/or other type of well. A well may be drilled in the ground for exploration and/or recovery of natural resources in the ground. For example, a well may be drilled in the ground to aid in extraction of petrochemical fluid (e.g., oil, gas, petroleum, fossil fuel). Application of the present disclosure to other types of wells and wells drilled for other purposes are contemplated.

Equipment may be installed at the well to facilitate well operations. For example, a wellhead may be installed at the top of the well. A wellhead may refer to one or more components at the top/surface of the well that provides structural and/or pressure-containing interface for drilling and production equipment. For example, a wellhead may include spools, valves, and/or adapters that provide pressure control of a production well. A wellhead may allow for connection of various equipment to the well for production. For example, for an underwater well (e.g., a subsea well), one end of a riser may be connected to a wellhead of a well and the other end of the riser may be connected to a surface facility, such as a platform, floating production storage, and/or offloading vessels. A riser may include one or more pipe that delivers fluid between the well/wellhead and the surface facility. A riser may include one or more flexible components, floatation components, and/or components to facilitate use of the riser in an underwater environment.

Movement of water around the riser may place force on the riser to push the riser out of its neutral position above the wellhead. Movement of water around the riser may cause shifting, vibration, and/or other movement of the riser. Shifting, vibration, and/or other movement of the riser may fatigue/weaken the wellhead connected to the riser. Wellhead fatigue damage may accumulate over a period of time. Too much wellhead fatigue damage may result in failure or breakage of the wellhead.

During offshore operations (e.g., drilling, completion, intervention), it is important to ensure the structural integrity of the involved equipment, such as subsea wellhead systems. One thing to be concerned about is the fatigue failure. When the metocean conditions deteriorate, the rig team often needs to decide whether operations must be paused due to estimated fatigue damage. Industry normally estimates the fatigue damage with current profiles normalized with the current profile having the maximum surface speed in the past weeks. This practice leads to excessive conservatism due to fatigue damage, which then leads to otherwise unnecessary operational interruptions. Therefore, a more accurate and quicker estimate for wellhead fatigue damage is needed.

The present disclosure provides accurate and fast estimation of wellhead fatigue damage (e.g., wellhead fatigue damage rate, accumulated wellhead fatigue damage). The tool of the present disclosure enables fatigue damage estimation using metocean data, including historical metocean data, real-time metocean data, (e.g., continuously varying, near-term metocean data), and/or forecasted metocean data. Historical metocean data may be used to estimate wellhead fatigue damage in the past, real-time metocean data may be used to estimate present wellhead fatigue damage rate, and forecasted metocean data may be used to estimate wellhead fatigue damage in the future. The estimated wellhead fatigue damage from up-to-date metocean data may be provided to rig team for a more confident decision making.

Metocean data for a wellhead may refer to data (information) relating to metocean conditions within the whole water depth including at or near the wellhead. Metocean conditions may refer to wind, wave, climate, and/or other environmental conditions that affect wellhead and/or water around/surrounding/above the wellhead. Metocean data for a wellhead may include data relating to water depth, waves, currents, tide and surge variations, and/or other environmental conditions around/surrounding/above the wellhead. For example, metocean data for a wellhead may define current profile for the wellhead and wave characteristics (e.g., peak wave period (Tp), significant wave height (Hs)) for the wellhead.

Metocean data for a wellhead may be used to determine wellhead fatigue damage due to wave, wellhead fatigue damage due to in-line and transverse oscillation/vibration of a riser attached to the wellhead, and/or other wellhead fatigue damage. For example, metocean data for a wellhead may be used to determine (1) a wave-induced wellhead fatigue damage rate and a riser vortex-induced vibration (VIV) caused wellhead fatigue damage rate. The wave-induced wellhead fatigue damage rate and the riser VIV caused wellhead fatigue damage rate may be combined (e.g., added) to determine the total wellhead fatigue damage rate. The total wellhead fatigue damage rate, along with accumulated wellhead fatigue damage and pre-determined maximum allowable fatigue damage (e.g., operational fatigue limit) for individual operations/events, may be used to make operational decisions at the well (e.g., performing a well operation, disconnecting the riser from the wellhead) and/or to perform one or more operations at the well.

The present disclosure enables wellhead fatigue damage to be determined using a probability distribution. Rather than providing a deterministic estimation of wellhead fatigue damage, the tool of the present disclosure provides estimation of wellhead fatigue damage with probabilities, which provide more information for use by the rig team in making operational decisions for the well. For example, near-term current profile expressed in its P10, P50, P90 values and near-term forecast of wave/swell data, including significant wave height (Hs) and peak period (Tp), may be used for a more accurate fatigue estimate to support rig decision marking in a nearly real-time manner. Some computation, such as generation of a look-up table relating the fatigue damage rate to sea state and modal analysis for the riser/subsea stack, may be pre-performed for a particular well/wellhead. Metocean data for a particular period (e.g., real-time, future period) may be used to estimate fatigue damage that is more granular and related to a wider range of possible weather/current conditions. Fatigue damage estimation of this disclosure is much quicker to address continuously evolving ocean conditions during offshore operations.

Figure 3:
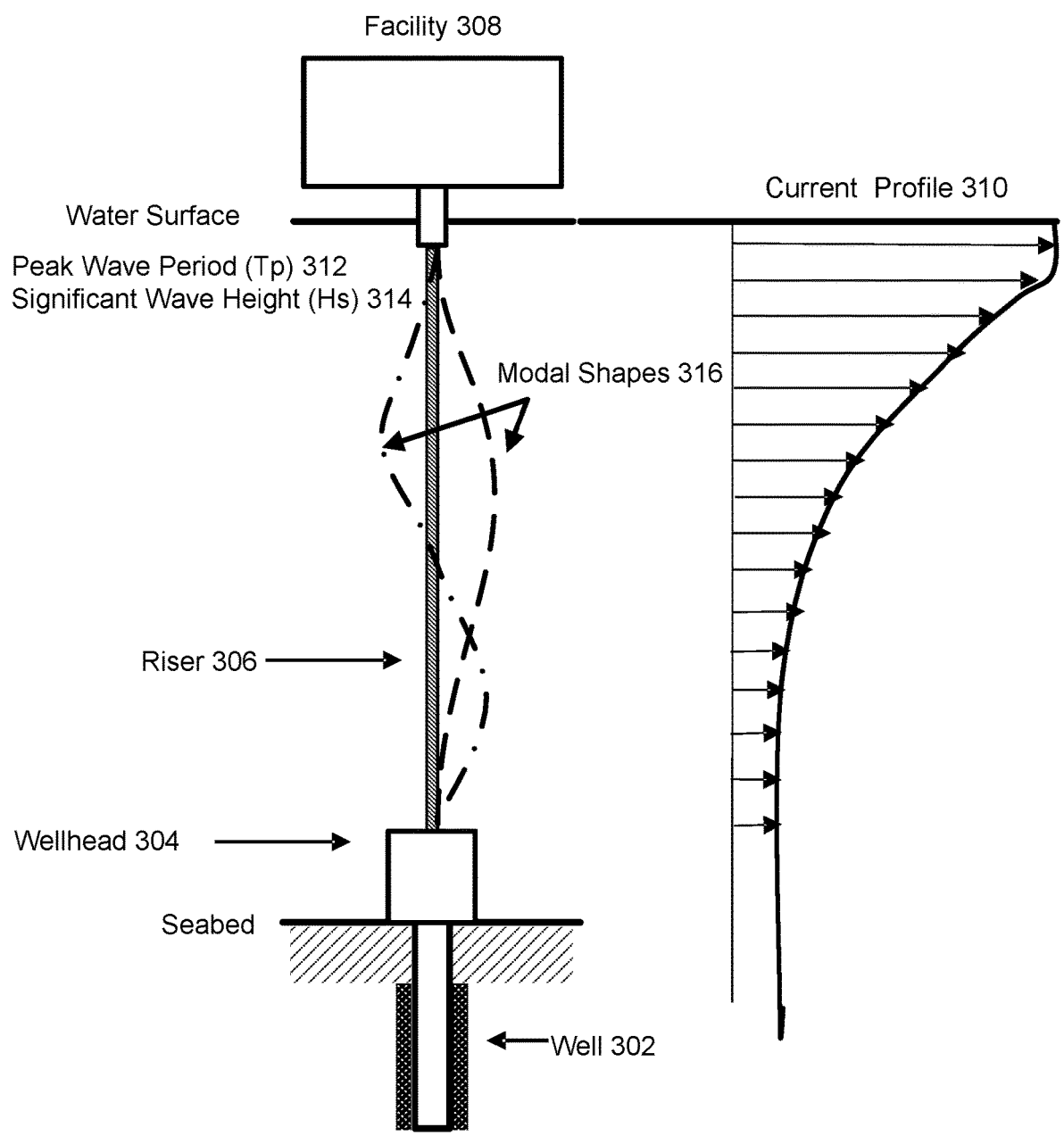
FIG. 3 illustrates an example underwater well.

FIG. 3 illustrates an example well 302. The well 302 may be located under the water. For example, the well 302 may be located under the ocean/sea. A wellhead 304 may be installed on the well 302, and a riser 306 may be connected to the wellhead 304. The riser 306 may provide a connection through which fluid may flow between the well 302/wellhead 304 and a facility 308 at/above the water surface. The well 302 and/or the riser 306 may include other components not shown in FIG. 3 (e.g., blowout preventer, lower marine riser package, flexible joint, slick joint, buoyancy joint, water current sensor). For example, water current sensors may be placed along the riser 306 to measure the speed and direction of water around the riser 306.

The speed of water movement along the riser may not be uniform. For example, FIG. 3 shows an example current profile 310 for the riser 306. The current profile 310 may show the maximum direction and speed of water movement projected onto a two dimensional plane. The current profile 310 may represent the speed and direction of water along the water column along the riser 306, from the water surface to the seabed. The current profile 310 may characterize the speed of water movement across the water column along the riser 306. The current profile 310 may characterize the speed of water movement (current speed) as a function of water depth (e.g., depth below the water surface). As shown in the current profile 310, the speed of water movement may change with changing depth.

Wave may move across the water surface. Physical features of the wave may be defined by peak wave period (Tp) 312 and significant wave height (Hs) 314. The peak wave period (Tp) 312 may refer to the period associated with the most energetic waves in the wave spectrum in a specific time period. The significant wave height (Hs) 314 may refer to the average wave height, from crest to trough, of the highest one-third of the waves in a specific time period. Movement of water may cause the riser 306 to move. Movement of water may cause vortex-induced vibration (VIV) of the riser 306. The riser 306 may be displaced/deformed into modal shapes 316 when vibrating at natural frequencies.

Figure 4:
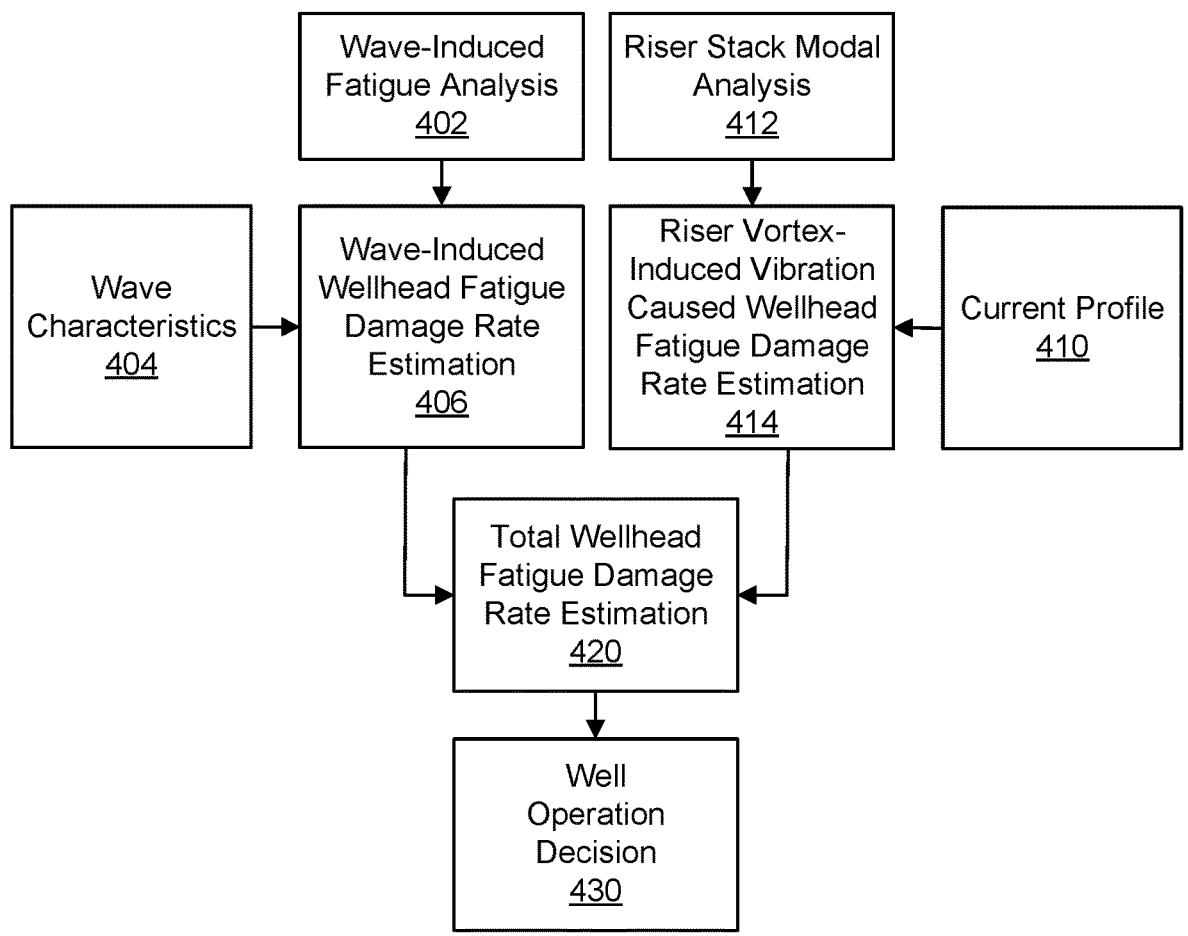
FIG. 4 illustrates an example process for estimating wellhead fatigue damage using metocean data.

FIG. 4 illustrates an example process 400 for estimating wellhead fatigue damage using metocean data. The process 40 may be used to convert a forecast of metocean conditions for a duration of time to predict the wellhead fatigue damage rate and/or how much wellhead fatigue damage will occur during the duration of time. A similar process may be used to convert measured metocean conditions for a period of time/real-time metocean conditions to predict historical/present wellhead fatigue damage rate and/or how much wellhead fatigue damage has occurred/is occurring.

At step 402 wave induced fatigue analysis may be performed for a wellhead to generate a look-up table of wave-induced wellhead fatigue damage rates for the wellhead. Wave-induced wellhead fatigue damage rate may refer to wellhead fatigue damage rate caused by/resulting from wave above the wellhead. Wave above the wellhead may cause movement of the riser connected to the wellhead, which may lead to fatigue damage of the wellhead. Wave-induced wellhead fatigue damage rates for different wave characteristics may be determined. For example, peak wave period (Tp) and significant wave height (Hs) may define physical features of the wave. A particular combination of peak wave period (Tp) and significant wave height (Hs) may define a particular sea state for a wellhead. Wave-induced wellhead fatigue damage rates for different wave characteristics may be determined. Wave-induced wellhead fatigue damage rates for different combinations of the peak wave period (Tp) and the significant wave height (Hs) (different sea states) may be determined. The look-up table of wave-induced wellhead fatigue damage rates for the wellhead may be used to convert different wave characteristics (combinations of peak wave period (Tp) and significant wave height (Hs)) to values of wave-induced wellhead fatigue damage rate.

Wave-induced wellhead fatigue damage rates for different combinations of peak wave period (Tp) and significant wave height (Hs) may be determined (e.g., computed, calculated, estimated) using one or more physics-based models to simulate the wellhead fatigue damage rate caused by/resulting from the wave. Wave-induced wellhead fatigue damage rates for different combinations of peak wave period (Tp) and significant wave height (Hs) may be determined using one or more machine-learning models trained using wave characteristics and measured wellhead fatigue damage rates. Other determination of wave-induced wellhead fatigue damage rates is contemplated.

At step 404, wave characteristics for a relevant time may be obtained. For estimation of historical wellhead fatigue damage, historical wave characteristics may be obtained. For instance, wave characteristics measured over a period of time may be obtained. For estimation of present wellhead fatigue damage, present wave characteristics may be obtained. For instance, wave characteristics currently being measured may be obtained and/or near-term wave characteristics for the wellhead may be forecasted. For example, the values of peak wave period (Tp) and significant wave height (Hs) for the next day, next few days, next week, and/or other time periods may be forecasted. For estimation of future wellhead fatigue damage, future wave characteristics may be obtained. For instance, wave characteristics for the wellhead in the future may be forecasted.

At step 406, a wave-induced wellhead fatigue damage rate for the time corresponding to the wave characteristics (e.g., historical wave characteristics, present wave characteristics, future wave characteristics) may be determined. The wave-induced wellhead fatigue damage rate may be determined using the wave characteristics and the previously performed wave-induced fatigue analysis. The wave-induced wellhead fatigue damage rate may be determined using the look-up table of wave-induced wellhead fatigue damage rates for the wellhead from the wave-induced fatigue analysis. The wave-induced wellhead fatigue damage rate for a particular combination of peak wave period (Tp) and significant wave height (Hs) may be determined from the look-up table via a two-dimensional interpolation-interpolation of damage rate along the peak wave period (Tp) dimension and the significant wave height (Hs) dimension.

In some implementations, the wave characteristics used to determine the corresponding wave-induced wellhead fatigue damage rate may be associated with probabilities. For example, at step 404, near-term wave characteristics for the wellhead may be forecasted for different probabilistic metocean conditions. For instance, the forecasted near-term wave characteristics for the wellhead may include P10 wave characteristics, P50 wave characteristics, and P90 wave characteristics. At step 406, prediction may be performed for different wave characteristics to obtain P10 wave-induced wellhead fatigue damage rate (covering 10th percentile of wave conditions, the mild end of the distribution), P50 wave-induced wellhead fatigue damage rate (covering the first 50th percentile of wave conditions), and P90 wave-induced wellhead fatigue damage rate (covering the 90th of wave conditions, all distribution up to the 90th percentile but not including the most severe 91-100th percentile). Use of other probabilities/ranges of probabilities is contemplated.

At step 412, a riser stack modal analysis may be performed to determine natural frequencies and modal shapes of the riser (and other equipment) connected to the wellhead. The frequencies and modal shapes from the riser stack modal analysis may be used to determine the riser VIV caused wellhead fatigue damage rates for different current profiles. The frequencies and modal shapes from the riser stack modal analysis may be reused for different current profiles and reduce the amount of time/computation needed to determine the riser VIV caused wellhead fatigue damage rates. The frequencies and modal shapes from the riser stack modal analysis, along with current profiles for a particular time, may be used to determine riser VIV caused wellhead fatigue damage rate for the particular defined environmental state or combination of states.

For example, the frequencies, modal shapes, and current profile may be input into a physics-based model to simulate the wellhead fatigue damage rate caused by/resulting from movement of the riser attached to the wellhead. The frequencies, modal shapes, and current profile may be input into a machine-learning model trained using system/equipment configuration, or frequencies and modal shapes from this system/equipment configuration, and current profile, and measured wellhead fatigue damage rates. The frequencies and modal shapes may be combined with current profile for a particular time (e.g., past, present, future) to determine the riser VIV caused wellhead fatigue damage rate for the particular time.

At step 410, one or more current profiles for a relevant time may be obtained. For estimation of historical wellhead fatigue damage, historical current profile may be obtained. For instance, current profile measured over a period of time may be obtained. For estimation of present wellhead fatigue damage, present current profile may be obtained. For instance, the current profile currently being measured may be obtained and/or near-term current profile for the wellhead may be forecasted. For example, the shape, direction, and/or values of the current profile for the next day, next few days, next week, and/or other time periods may be forecasted. For estimation of future wellhead fatigue damage, future current profile may be obtained. For instance, current profile for the wellhead in the future may be forecasted.

At step 414, a riser VIV caused wellhead fatigue damage rate for the time corresponding to the current profile(s) may be determined. A riser VIV caused wellhead fatigue damage rate may refer to wellhead fatigue damage rate caused by/resulting from movement of the riser (vibration, oscillation, displacement, deformation). The movement of the riser may refer to the movement of the riser stack. The riser VIV caused wellhead fatigue damage rate may be determined using the current profile(s) and the previously calculated frequencies and modal shapes from the riser stack modal analysis.

In some implementations, the current profile(s) used to determine the corresponding riser VIV caused wellhead fatigue damage rate may be associated with probabilities. For example, at step 410, near-term current profile(s) for the wellhead may be forecasted for different probabilistic metocean conditions. For instance, the forecasted near-term current profiles for the wellhead may include P10 current profile, P50 current profile, and P90 current profile. At step 414, prediction may be performed for different current profiles to obtain P10 riser VIV caused wellhead fatigue damage rate (covering 10th percentile of current profiles), P50 riser VIV caused wellhead fatigue damage rate (covering 50th percentile of current profiles), and P90 riser VIV caused wellhead fatigue damage rate (covering 90th percentile of current profiles). Use of other probabilities/ranges of probabilities is contemplated.

At step 420, the wave-induced wellhead fatigue damage rate (wellhead fatigue damage rate due to movement of the riser caused by the wave) and the riser VIV caused wellhead fatigue damage rate (wellhead fatigue damage rate due to the riser VIV) may be added together to determine the total fatigue damage rate for the wellhead (the total wellhead fatigue damage rate). The wave-induced wellhead fatigue damage rate, the riser VIV caused wellhead fatigue damage rate, and/or the total wellhead fatigue damage rate may be determined as percentage values and/or other values (e.g., percentage to be deducted from the integrity of the wellhead over a period of time).

In some implementations, the wave-induced wellhead fatigue damage rate and the riser VIV caused wellhead fatigue damage rate associated with same probabilities may be added together to determine the total wellhead fatigue damage rates for different probabilities, such as P10 total wellhead fatigue damage rate, P50 total wellhead fatigue damage rate, and P90 total wellhead fatigue damage rate. Use of other probabilities/ranges of probabilities and other methodologies used to add the wave-induced wellhead fatigue damage rate and the riser VIV caused wellhead fatigue damage rate is contemplated.

At step 430, one or more operational decisions for the rig/wellhead/riser may be made based on the total wellhead fatigue damage rate for the wellhead. For example, the wellhead fatigue damage accumulation calculated by integrating the total wellhead fatigue damage rate forecast over the duration of an operation may be compared with fatigue limit (fatigue allowance) for the operation to determine whether the operation should be performed or not performed. If the wellhead fatigue damage accumulation is under the fatigue limit, the operation may be performed. If the wellhead fatigue damage accumulation is over the fatigue limit for the operation, the operation may not be performed unless appropriate mitigations are in place. If the wellhead fatigue damage accumulation is over the fatigue limit for the operation, the riser may be disconnected from the wellhead to prevent/reduce fatigue damage to the wellhead.

Other information relating to wellhead fatigue damage, such as the amount of wellhead fatigue damage accumulated at the wellhead, the maximum allowable fatigue damage for an operation, and/or the maximum allowable fatigue damage up to the subject time point/for life cycle of the wellhead, may be used to make operational decisions. In some implementations, operational decision(s) may be made by one or more personnels. In some implementations, operational decision(s) may be made automatically using one or more computing devices. In some implementations, one or more operations may be recommended, scheduled, performed, and/or otherwise facilitated based on the total wellhead fatigue damage rate. Information relating to wellhead fatigue damage (e.g., total wellhead fatigue damage rate, accumulated wellhead fatigue damage, remaining wellhead life, remaining time of operation, maximum allowable fatigue damage) may be presented on an electronic display. For example, amount of time (e.g., number of day) for which an operation may be performed based on forecasted wave characteristics and/or forecasted current profile without going over a fatigue limit may be presented on an electronic display.

The estimation of wellhead fatigue damage from metocean data may assist well operators to make informed decisions from wellhead fatigue perspective as to whether one or more operations should be suspended or performed. The process 400 may be performed/repeated with real-time monitoring of the metocean conditions for a wellhead to make informed decisions for well operations. The process 400 may be performed/repeated with real-time monitoring of the metocean conditions for a wellhead to increase (e.g., optimize) use of the well and avoid unnecessary non-use of the well (e.g., avoid disconnection from the well due to inaccurate forecast of wellhead fatigue damage rate)

FIG. 5 illustrates an example look-up table 500 for wave induced wellhead fatigue damage rate. A combination of peak wave period (Tp) and significant wave height (Hs) may define a sea state for a wellhead. Wave-induced wellhead fatigue damage rates for a sea state with a non-zero probability of occurrence (cells with ##) may be determined (e.g., using wave-induced fatigue analysis) and may be used to populate the look-up table 500.

Once the look-up table 500 for a wellhead is generated, wave characteristics for a particular time may be used to determine the wave-induced wellhead fatigue damage rate for the particular time. The look-up table 500 may be reused for different wave characteristics and reduce the amount of time/computation needed to determine the wave-induced wellhead fatigue damage rates. Two-dimensional interpolation may be used to determine wave-induced wellhead fatigue damage rate for a particular combination of peak wave period (Tp) and significant wave height (Hs).

For example, wave-induced wellhead fatigue damage rate for a particular time in the past may be determined by finding in the look-up table the value of the wave-induced wellhead fatigue damage rate that corresponds to the historical values of peak wave period (Tp) and significant wave height (Hs). Present wave-induced wellhead fatigue damage rate may be determined by finding in the look-up table the value of the wave-induced wellhead fatigue damage rate that correspond to the present or real-time values of peak wave period (Tp) and significant wave height (Hs). Future wave-induced wellhead fatigue damage rate may be forecasted by finding in the look-up table the value of the wave-induced wellhead fatigue damage rate that correspond to the forecasted values of peak wave period (Tp) and significant wave height (Hs).

Figure 6:
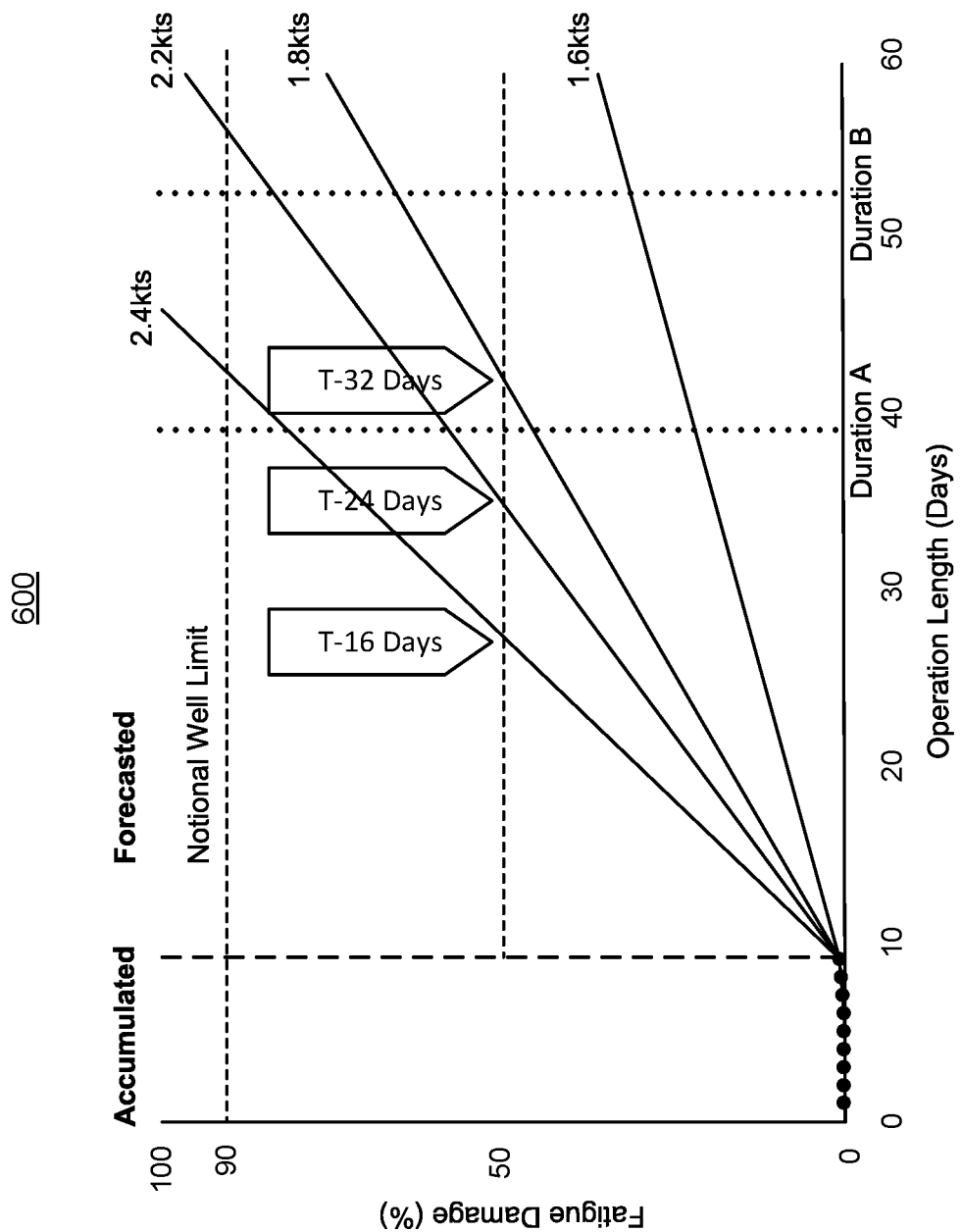
FIG. 6 illustrates an example view of accumulated and forecasted wellhead fatigue damage for a wellhead.

FIG. 6 illustrates an example view 600 of accumulated and forecasted wellhead fatigue damage for a wellhead. The view 600 may be updated based on changes to present metocean conditions and/or forecasted metocean conditions for a wellhead. The view 600 may be presented on one or more electronic displays and/or otherwise communicated to one or more personnels.

In the view 600, a notional wellhead fatigue damage limit may be set at 90%. The notional wellhead fatigue damage limit may be set as a suggested wellhead fatigue damage limit for the life cycle of the wellhead. Accumulated wellhead fatigue may be shown up to day 10. On day 10, wellhead fatigue damage rate in the future may be predicted and used to forecast how much/quickly wellhead will be fatigued based on continued operation. For example, based on forecasts of different metocean conditions (e.g., peak wave period (Tp), significant wave height (Hs), and current profile for waves of different speeds: 1.6 kts, 1.8 kts, 2.2 kts, 2.4 kts), different wellhead fatigue damage rates may be forecasted for the future. The view may show expected and/or planned duration of operations for the well (E.g., duration A, duration B), and provide information on how much wellhead fatigue damage is predicted to be accumulated at the wellhead after the expected and/or planned duration of operations for the well. The view 600 may show how many days of operations may be performed based on different metocean conditions before a certain amount of wellhead fatigue damage has accumulated. For example, the view 600 may show that (1) with the forecast of mild metocean conditions, the well may be operated for thirty-two days before 50% wellhead fatigue damage is accumulated, (2) with the forecast of average metocean conditions, the well may be operated for twenty-four days before 50% wellhead fatigue damage is accumulated, and (3) under the forecast of harsh metocean conditions, the well may be operated for sixteen days before 50% wellhead fatigue damage is accumulated. Other views of wellhead fatigue may be generated and/or presented.

In some implementations, different wellhead fatigue damage limits may be determined and/or presented. For example, wellhead fatigue damage limit (maximum allowable fatigue damage) may be determined for different times and/or different events at the well. That is, rather than giving a single wellhead fatigue limit for the entire life cycle of the wellhead, separate amounts of wellhead fatigue damage may be allotted to different times periods and/or to different events (e.g., different drilling events such as drilling a hole or running a casing into the hole). Wellhead fatigue damage accumulation at the wellhead may be tracked using sensor measurements at the wellhead, measured metocean conditions, and/or other information. Measured metocean conditions and predictions of future metocean conditions may be used to estimate present wellhead fatigue damage rates and future wellhead fatigue damage rates. Accumulated wellhead fatigue damage and wellhead fatigue damage rates may be used to facilitate one or more operations at the well. Information on wellhead fatigued damage rates may be used to make operational decisions at the well, such as what kind of operations should be performed at the well, how the operations should be performed at the well, and/or how long operations should be performed at the well.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate estimating wellhead fatigue damage using metocean data. The machine-readable instructions 100 may include one or more computer program components. The machine-readable instructions 100 may include one or more of a metocean component 102, a wave fatigue component 104, a riser vortex-induced vibration fatigue component 106, a total fatigue component 108, a well operation component 110, and/or other computer program components.

The metocean component 102 may be configured to obtain metocean information and/or other information. Obtaining metocean information may include one or more of accessing, acquiring, analyzing, determining, examining, generating, identifying, loading, locating, measuring, opening, receiving, retrieving, reviewing, selecting, storing, and/or otherwise obtaining the metocean information. The metocean component 102 may obtain metocean information from one or more locations. For example, the metocean component 102 may obtain metocean information from a storage location, such as the electronic storage 13, electronic storage of a device accessible via a network, and/or other locations. The metocean component 102 may obtain metocean information from one or more hardware components (e.g., a computing device, sensors) and/or one or more software components (e.g., software running on a computing device). In some implementations, the metocean information may be obtained from one or more users. For example, a user may interact with a computing device to input the metocean information (e.g., upload the metocean information, specify the metocean conditions for a well/wellhead).

The metocean information may characterize metocean conditions for a wellhead. The metocean information may characterize metocean conditions for a wellhead by defining, describing, identifying, quantifying, reflecting, setting forth, and/or otherwise characterizing the metocean conditions for the wellhead. The metocean information may include information relating to metocean conditions within the whole water depth including at or near the wellhead. The metocean information may include information relating to water depth, waves, currents, tide and surge variations, and/or other environmental conditions around/surrounding/above the wellhead. In some implementations, the metocean information may include time series information. The metocean information may characterize metocean conditions at different moments in time. The metocean information may characterize changes in metocean conditions through time.

The metocean information may characterize metocean conditions for a wellhead by including information that defines one or more content, qualities, attributes, features, and/or other aspects of the metocean conditions for the wellhead. For example, the metocean information may characterize metocean conditions for a wellhead by including information that specifies types and values of metocean conditions for the wellhead. Other types of metocean information are contemplated.

Metocean conditions for a wellhead may refer to wind, wave, climate, and/or other environmental conditions that affect wellhead and/or water around/surrounding/above the wellhead. The metocean conditions for the wellhead may include current profile for the wellhead and wave characteristics for the wellhead. The wave characteristics for the wellhead may include peak wave period and significant wave height for the wellhead. Other wave characteristics are contemplated.

The metocean conditions for the wellhead may correspond to a time. The time corresponding to the metocean conditions for the wellhead may include a historical time, a present time, or a future time. Historical metocean conditions may be used to determine historical wellhead fatigued damage/historical wellhead fatigued damage rate. Present metocean conditions may be used to determine present wellhead fatigued damage/present wellhead fatigued damage rate. Future metocean conditions may be used to determine future wellhead fatigued damage/future wellhead fatigued damage rate.

In some implementations, the metocean conditions for the wellhead may be associated with probabilities. For example, different metocean conditions (e.g., separate combinations of peak wave period, significant wave height, and current profile) may be measured or forecasted with a certain percentage of confidence. Wellhead fatigue damage/wellhead fatigue damage rate determined from metocean conditions may be associated with the same probabilities as the metocean conditions. Different metocean conditions with separate probabilities may be used to calculate separate values of wellhead fatigue damage/wellhead fatigue damage rate. The separate values of wellhead fatigue damage/wellhead fatigue damage rate may be combined based on the associated probabilities. For example, one set of metocean condition with 90% probability may be used to determine wellhead fatigue damage/wellhead fatigue damage rate with 90% likelihood, and another set of metocean condition with 10% probability may be used to determine wellhead fatigue damage/wellhead fatigue damage rate with 10% likelihood. The two separate values of wellhead fatigue damage/wellhead fatigue damage rate may be combined, such as by using the probabilities associated with the values as weights for the values. Such combination of wellhead fatigue damage/wellhead fatigue damage rate may enable determination of weighted wellhead fatigue damage/wellhead fatigue damage rate that considers multiple metocean conditions and their probabilities.

The wave fatigue component 104 may be configured to determine a wave-induced wellhead fatigue damage rate for the wellhead. Determining a wave-induced wellhead fatigue damage rate may include ascertaining, approximating, calculating, establishing, estimating, finding, identifying, obtaining, quantifying, selecting, setting, and/or otherwise determining the wave-induced wellhead fatigue damage rate. A wellhead fatigue damage rate for a wellhead may refer to a rate at which fatigue damage is being accumulated at the wellhead. A wellhead fatigue damage rate may refer to a rate at which the wellhead is experiencing fatigue damage. In some implementations, a wellhead fatigue damage rate may be determined as a percentage value and/or other values. For example, a wellhead fatigue damage rate may be determined as a percentage of allowable damage of the wellhead. For example, an undamaged wellhead may have started with 100% allowable damage. A wellhead fatigue damage rate may be determined as how much of the allowable damage will be accumulated at the wellhead for a particular duration of time (e.g., 3% for 48-hour period). A wave-induced wellhead fatigue damage rate may refer to a wellhead fatigue damage rate caused by/resulting from wave above the wellhead. A wave-induced wellhead fatigue damage rate may refer to a wellhead fatigue damage rate caused by/resulting from movement of water/equipment due to/reflected by the wave above the wellhead.

The wave-induced wellhead fatigue damage rate for the wellhead may be determined based on the metocean conditions for the wellhead and/or other information. Different values of wave-induced wellhead fatigue damage rate/different-induced wellhead fatigue damage rates may be determined based on different metocean conditions for the wellhead. For example, the wave-induced wellhead fatigue damage rate for the wellhead may be determined based on the wave characteristics (e.g., peak wave period and significant wave height) for the wellhead. Different combinations of wave characteristics may result in different values of wave-induced wellhead fatigue damage rate for the wellhead.

In some implementations, a wave-induced fatigue analysis may be performed for the wellhead to predetermine values of the wave-induced wellhead fatigue damage rate for different sea states. The different sea states may be defined by different combinations of peak wave period and significant wave height. The wave-induced fatigue analysis may be performed to prepopulate a two-dimensional look-up table of wave-induced wellhead fatigue damage rates. The look-up table, such as shown in FIG. 5, may provide different values of wave-induced wellhead fatigue damage rate for different combinations of peak wave period and significant wave height. The wave-induced wellhead fatigue damage rates for different combinations of peak wave period and significant wave height may be determined (e.g., computed, calculated, estimated) using one or more physics-based models to simulate the wellhead fatigue damage rate caused by/resulting from the wave. The wave-induced wellhead fatigue damage rates for different combinations of peak wave period and significant wave height may be determined using one or more machine-learning models trained using wave characteristics and measured wellhead fatigue damage rates.

The wave-induced wellhead fatigue damage rate for the wellhead may be determined based on a two-dimensional interpolation of the predetermined values of the wave-induced wellhead fatigue damage rate for a given sea state. For a given combination of peak wave period and significant wave height, the corresponding value of wave-induced wellhead fatigue damage rate may be found in the look-up table. When the exact combination of peak wave period and significant wave height is not found in the look-up table, the wave-induced wellhead fatigue damage rate may be determined by interpolating between the predetermined wave-induced fatigue damage rates under various combinations of peak wave period and significant wave height in the look-up table. Use of the predetermined values of the wave-induced wellhead fatigue damage rate in the look-up table to determine the wave-induced wellhead fatigue damage rate for the wellhead may reduce time and resources required to determine the wave-induced wellhead fatigue damage rate for the wellhead.

In some implementations, a wave-induced wellhead fatigue damage rate for a wellhead may be determined based on predetermine values of the wave-induced wellhead fatigue damage rate for a different wellhead. For example, a look-up table of wave-induced wellhead fatigue damage rates generated for a wellhead may be used to determine the wave-induced wellhead fatigue damage rate for another wellhead. For example, the look-up table generated for a wellhead may be used with other wellhead with similar/same physical characteristics (e.g., similar/same water depths, similar/same wellhead/riser configuration).

In some implementations, the wave-induced wellhead fatigue damage rate may be determined for a time corresponding to the metocean conditions for the wellhead. With historical metocean conditions, historical wave-induced wellhead fatigue damage rate may be determined. With present metocean conditions, present wave-induced wellhead fatigue damage rate may be determined. With future metocean conditions, future wave-induced wellhead fatigue damage rate may be determined.

The riser vortex-induced vibration fatigue component 106 may be configured to determine a riser vortex-induced vibration caused wellhead fatigue damage rate for the wellhead. Determining a riser vortex-induced vibration caused wellhead fatigue damage rate may include ascertaining, approximating, calculating, establishing, estimating, finding, identifying, obtaining, quantifying, selecting, setting, and/or otherwise determining the riser vortex-induced vibration caused wellhead fatigue damage rate. A riser vortex-induced vibration caused wellhead fatigue damage rate may refer to a wellhead fatigue damage rate caused by/resulting from movement of the riser (vibration, oscillation, displacement, deformation) driven by a riser vortex-induced vibration. The movement of the riser may refer to the movement of the riser stack. Different movements of the riser may be caused by different current profiles.

The riser vortex-induced vibration caused wellhead fatigue damage rate for the wellhead may be determined based on the metocean conditions for the wellhead and/or other information. Different values of riser vortex-induced vibration caused wellhead fatigue damage rate/different riser vortex-induced vibration caused wellhead fatigue damage rates may be determined based on different metocean conditions for the wellhead. For example, the riser vortex-induced vibration caused wellhead fatigue damage rate for the wellhead may be determined based on the current profile for the wellhead. Different current profiles may result in different values of riser vortex-induced vibration caused wellhead fatigue damage rate for the wellhead.

In some implementations, a modal analysis may be performed to predetermine natural frequencies and modal shapes of a riser (and other equipment) connected to the wellhead. A natural frequency of the riser may refer to the frequency at which the riser (and other equipment) oscillates in the absence of disturbance (when not subjected to a continuous or repeated external force). A modal shape may refer to the shape/deformation of the riser (and other equipment) when vibrating at natural frequencies.

The riser vortex-induced vibration caused wellhead fatigue damage rate for the wellhead may be determined based on the predetermined natural frequencies and the predetermined modal shapes of the riser connected to the wellhead. The frequencies and modal shapes from the modal analysis (riser stack model analysis) may be used to determine the riser vortex-induced vibration caused wellhead fatigue damage rates for different current profiles. The frequencies and modal shapes from the riser stack modal analysis, along with current profiles for a particular time, may be used to determine riser vortex-induced vibration caused wellhead fatigue damage rate for the particular defined environmental state or combination of states.

For example, the frequencies, modal shapes, and current profile may be input into a physics-based model to simulate the wellhead fatigue damage rate caused by/resulting from movement of the riser attached to the wellhead. The frequencies, modal shapes, and current profile may be input into a machine-learning model trained using system/equipment configuration, or frequencies and modal shapes from this system/equipment configuration, and current profile, and measured wellhead fatigue damage rates. Use of the predetermined natural frequencies and the predetermined modal shapes of the riser connected to the wellhead to determine the riser vortex-induced vibration caused wellhead fatigue damage rate for the wellhead may reduce time and resources required to determine the riser vortex-induced vibration caused wellhead fatigue damage rate for the wellhead for different current profiles since the predetermined natural frequencies and the predetermined modal shapes may remain the same for different current profiles.

In some implementations, the riser vortex-induced vibration caused wellhead fatigue damage rate may be determined for a time corresponding to the metocean conditions for the wellhead. With historical metocean conditions, historical riser vortex-induced vibration caused wellhead fatigue damage rate may be determined. With present metocean conditions, present riser vortex-induced vibration caused wellhead fatigue damage rate may be determined. With future metocean conditions, future riser vortex-induced vibration caused wellhead fatigue damage rate may be determined.

The total fatigue component 108 may be configured to determine a total wellhead fatigue damage rate for the wellhead. Determining a total wellhead fatigue damage rate may include ascertaining, approximating, calculating, establishing, estimating, finding, identifying, obtaining, quantifying, selecting, setting, and/or otherwise determining the total wellhead fatigue damage rate. The total wellhead fatigue damage rate may refer to the total rate at which fatigue damage is being accumulated at the wellhead. The total wellhead fatigue damage rate may refer to the total rate at which the wellhead is experiencing fatigue damage. The total wellhead fatigue damage rate for a wellhead may include wellhead fatigue damage rate due to the wave characteristics and the current profile for the wellhead.

The total wellhead fatigue damage rate for the wellhead may be determined based on the wave-induced wellhead fatigue damage rate, the riser vortex-induced vibration caused wellhead fatigue damage rate, and/or other information. The wave-induced wellhead fatigue damage rate and the riser vortex-induced vibration caused wellhead fatigue damage rate corresponding to the same time may be combined/added to determine the total wellhead fatigue damage rate for that time.

In some implementations, the total wellhead fatigue damage rate determined for the wellhead may include a probabilistic total wellhead fatigue damage rate. For example, separate total wellhead fatigue damage rates may be determined for different probabilities. The total wellhead fatigue damage rate may be associated with same probabilities as the wave-induced wellhead fatigue damage rate and the riser vortex-induced vibration caused wellhead fatigue damage rate combined to determine the total wellhead fatigue damage rate. For example, P10 wave-induced wellhead fatigue damage rate and P10 riser vortex-induced vibration caused wellhead fatigue damage rate combined to determine P10 total wellhead fatigue damage rate and P90 wave-induced wellhead fatigue damage rate and P90 riser vortex-induced vibration caused wellhead fatigue damage rate combined to determine P90 total wellhead fatigue damage rate.

As another example, a total wellhead fatigue damage rates may be determined by combining wave-induced wellhead fatigue damage rate and the riser vortex-induced vibration caused wellhead fatigue damage rate associated with different probabilities. The probabilities associated with the individual wellhead fatigue damage rates may be used as weights in combining the different wellhead fatigue damage rates. For example, a total wellhead fatigue damage rate for metocean condition with 10% likelihood of occurrence may be combined with a total wellhead fatigue damage rate for metocean condition with 90% likelihood of occurrence by using 0.1 as the weight for the total wellhead fatigue damage rate for metocean condition with 10% likelihood of occurrence and 0.9 as the weight for the total wellhead fatigue damage rate for metocean condition with 90% likelihood of occurrence. Such combination of wellhead fatigue damage rate may enable determination of weighted wellhead fatigue damage/wellhead fatigue damage rate that considers multiple metocean conditions and their probabilities.

The total wellhead fatigue damage for a period of time may be determined based on the total wellhead fatigue damage rate for the period of time and/or other information. The total wellhead fatigue damage rate may be multiplied by the time length for which (1) the total wellhead fatigue damage rate was applicable, and (2) the well/wellhead was in operation (e.g., connected to the riser). The total wellhead fatigue damage may be determined for the entire life cycle of the wellhead, for one or more durations of time, and/or for one or more operations.

The well operation component 110 may be configured to facilitate one or more well operations. A well operation may refer to an operation relating to a well. A well operation may refer to performance of work on and/or use of a well. A well operation may refer to an activity involving a well. A well operation may refer to an operation of a well in which the riser is connected to the wellhead of the well. Facilitating a well operation may include making the well operation easier. Facilitating a well operation may include enabling/assisting in preparation, planning, and/or performance of the well operation. Facilitating a well operation may include controlling the well operation. Facilitating a well operation may include starting, stopping, changing, preventing, and/or otherwise controlling the well operation. Other facilitations of well operations are contemplated.

The well operation(s) may be facilitated based on the total wellhead fatigue damage rate for the wellhead and/or other information. The total wellhead fatigue damage rate for the wellhead may be used to make operational decisions at the well. The total wellhead fatigue damage rate for the wellhead may be used to plan and/or perform well operations. The total wellhead fatigue damage rate for the wellhead may be used to determine which well operations will be performed, whether a well operation will be performed, and/or how long the well operation will be performed.

Facilitation of a well operation based on the total wellhead fatigue damage rate for the wellhead may include presentation of information relating to the total wellhead fatigue damage rate for the wellhead on one or more displays, monitoring of the well operation based on information relating to the total wellhead fatigue damage rate for the wellhead, planning of the well operation based on information relating to the total wellhead fatigue damage rate for the wellhead, automation of the well operation based on information relating to the total wellhead fatigue damage rate for the wellhead, and/or other facilitation of the well operation. Information relating to the total wellhead fatigue damage rate may include the total wellhead fatigue damage rate itself, information derived from the total wellhead fatigue damage rate, and/or information from which the total wellhead fatigue damage rate are derived. For example, information relating to the total wellhead fatigue damage rate may include an accumulated wellhead fatigue damage at the wellhead, an allowable fatigue damage limit, and/or other information.

The accumulated wellhead fatigue damage at the wellhead may refer to an amount of fatigue damage accumulated at/experienced by the wellhead. The accumulated wellhead fatigue damage may refer to an amount of fatigue damage accumulated at/experienced by the wellhead for the entire time since the wellhead has been installed at the well (total accumulated wellhead fatigue damage). The accumulated wellhead fatigue damage may refer to an amount of fatigue damage accumulated at/experienced by the wellhead for a particular duration of time/particular operation (operational accumulated wellhead fatigue damage). The accumulated wellhead fatigue damage may be determined based on the total wellhead fatigue damage rate (e.g., real-time total wellhead fatigue damage rate, past total wellhead fatigue damage rate, forecasted total wellhead fatigue damage rate) and the duration of time corresponding to the total wellhead fatigue damage rate.

The allowable fatigue damage limit may refer to how much additional fatigue damage may be accumulated at/experienced by the wellhead before failure or breakage of the wellhead is expected. The allowable fatigue damage limit may indicate the remaining "life" of the wellhead for the life cycle of the wellhead (total allowable fatigue damage limit). The allowable fatigue damage limit may indicate the remaining "life" of the wellhead for a particular duration of time/particular operation (operational allowable fatigue damage limit).

The allowable fatigue damage limit may be determined based on the accumulated wellhead fatigue damage. The allowable fatigue damage limit may be determined by subtracting the original allowable fatigue damage limit (e.g., 100% for a new wellhead; less than 100% for an existing wellhead; certain percentage for an operation) by the accumulated wellhead fatigue damage. The allowable fatigue damage limit may be determined for a particular duration of time/particular operation. For example, a specific well operation may be assigned an operational allowable fatigue damage limit (a limit on how much fatigue damage may be accumulated/experienced by the wellhead for a particular duration of time/particular operation; the maximum allowable fatigue damage accumulation for a particular duration of time/particular operation). The remaining operational allowable fatigue damage limit may be determined by subtracting the fatigue limit for the particular duration of time/particular operation by the accumulated wellhead fatigue damage during the particular duration of time/particular operation.

The wave-induced wellhead fatigue damage rate, the riser vortex-induced vibration caused wellhead fatigue damage rate, the total wellhead fatigue damage rate, the accumulated wellhead fatigue damage, and/or the allowable fatigue damage limit may be presented on one or more electronic displays. The wellhead fatigue damage rate(s) may be presented with corresponding time durations. For example, forecasted total wellhead fatigue damage rate may be presented along with the future duration (e.g., next 48 to 72 hours) in which the total wellhead fatigue damage rate is forecasted. The accumulated wellhead fatigue damage since the installation of the wellhead and/or the accumulated wellhead fatigue damage for a particular duration of time/particular operation may be presented on the electronic display(s). The allowable fatigue damage limit for the life of the wellhead and/or the allowable fatigue damage limit for a particular duration of time/particular operation may be presented on the electronic display(s). Operators may plan and/or make operational decisions for the well based on the information presented.

In some implementations, the well operation(s) may be facilitated further based on an accumulated wellhead fatigue damage at the wellhead and an allowable fatigue damage limit for the wellhead. The well operation(s) may be facilitated further based on the total accumulated wellhead fatigue damage and the total allowable fatigue damage limit for the wellhead. The well operation(s) may be facilitated by tracking wellhead fatigue damage throughout the life cycle of the wellhead. The well operation(s) may be facilitated further based on the operational accumulated wellhead fatigue damage and the operational allowable fatigue damage limit for the wellhead (e.g., for subject operation, such as drilling, completion, intervention). The well operation(s) may be facilitated by tracking wellhead fatigue damage for a specific operation.

In some implementations, facilitation of the well operation(s) based on the total wellhead fatigue damage rate for the wellhead may include monitoring the remaining allowable fatigue damage limit based on the accumulated wellhead fatigue damage and/or other information. The remaining allowable fatigue damage limit for the life of the wellhead and/or the remaining allowable fatigue damage limit for a particular duration of time/particular operation may be monitored. Monitoring the remaining allowable fatigue damage limit may include regularly calculating, checking, presenting, and/or otherwise monitoring the remaining allowable fatigue damage limit.

For example, monitoring the remaining allowable fatigue damage limit may include determining when the remaining allowable fatigue damage limit reaches one or more levels. Monitoring the remaining allowable fatigue damage limit may include determining when the remaining allowable fatigue damage limit is within a threshold value of one or more levels. Monitoring the remaining allowable fatigue damage limit may include presenting real-time values of remaining allowable fatigue damage limit on one or more electronic displays. Monitoring the remaining allowable fatigue damage limit may include generating one or more alarms (e.g., more visual, audible, and/or haptic alarms) based on the remaining allowable fatigue damage limit reaching one or more levels/being within a threshold value of one or more levels.

In some implementations, one or more well operations may be performed/not performed based on Information relating to the wellhead fatigue damage rate. For example, an operation at a well may be stopped and the riser may be disconnected from the wellhead responsive to the remaining allowable fatigue damage limit reaching one or more levels/being within a threshold value of one or more levels. For instance, in response to the remaining allowable fatigue damage limit for a particular operation reaching a certain level (e.g., a low value, 0%), the operation may be automatically stopped, and the riser may be disconnected from the wellhead to prevent further fatigue damage at the wellhead.

As another example, a well operation may be permitted or not permitted to proceed based on forecast of total wellhead fatigue damage rate. The forecast of total wellhead fatigue damage rate may be used to determine the expected accumulated wellhead fatigue damage for the well operation. The expected accumulated wellhead fatigue damage for the well operation may be determined based on the duration of the well operation and the total wellhead fatigue damage rate forecasted for the duration. The well operation may not be permitted to proceed based on the expected accumulated wellhead fatigue damage for the well operation exceeding the allowable fatigue damage limit for the well operation. The riser may be disconnected from the wellhead based on the expected accumulated wellhead fatigue damage for the well operation exceeding the allowable fatigue damage limit for the well operation.

On the other hand, the well operation may be permitted to proceed based on the expected accumulated wellhead fatigue damage for the well operation not exceeding the allowable fatigue damage limit for the well operation. Based on the forecast of accumulated wellhead fatigue damage for the well operation not exceeding the allowable fatigue damage limit for the well operation, the well operation may be permitted to proceed. Ongoing well operation may be stopped (e.g., stopping operation at the well and disconnecting the riser from the wellhead) and/or alarms may be generated based on the actual accumulated wellhead fatigue damage for the well operation exceeding the expected accumulated wellhead fatigue damage for the well operation and/or the allowable fatigue damage limit for the well operation. Other control and/or automation of well operations based on information relating to the wellhead fatigue damage rate(s) are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the electronic display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
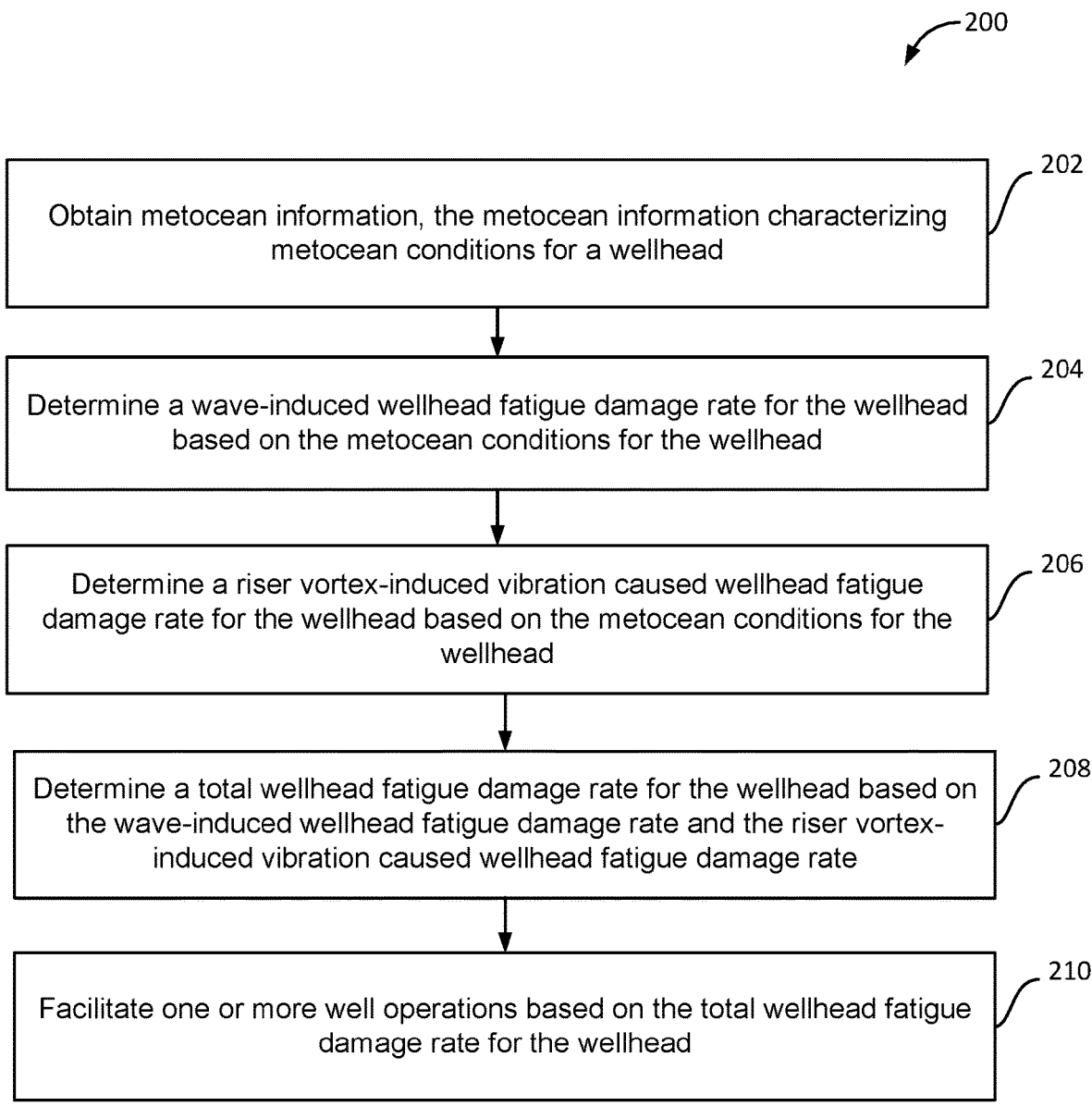
FIG. 2 illustrates an example method for estimating wellhead fatigue damage using metocean data.

FIG. 2 illustrates method 200 for estimating wellhead fatigue damage using metocean data. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, metocean information and/or other information may be obtained. The metocean information may characterize metocean conditions for a wellhead. In some implementations, operation 202 may be performed by a processor component the same as or similar to the metocean component 102 (Shown in FIG. 1 and described herein).

At operation 204, a wave-induced wellhead fatigue damage rate for the wellhead may be determined based on the metocean conditions for the wellhead and/or other information. In some implementations, operation 204 may be performed by a processor component the same as or similar to the wave fatigue component 104 (Shown in FIG. 1 and described herein).

At operation 206, a riser vortex-induced vibration caused wellhead fatigue damage rate for the wellhead may be determined based on the metocean conditions for the wellhead and/or other information. In some implementations, operation 206 may be performed by a processor component the same as or similar to the riser vortex-induced vibration fatigue component 106 (Shown in FIG. 1 and described herein).

At operation 208, a total wellhead fatigue damage rate for the wellhead may be determined based on the wave-induced wellhead fatigue damage rate, the riser vortex-induced vibration caused wellhead fatigue damage rate, and/or other information. In some implementations, operation 208 may be performed by a processor component the same as or similar to the total fatigue component 108 (Shown in FIG. 1 and described herein).

At operation 210, one or more well operations may be facilitated based on the total wellhead fatigue damage rate for the wellhead and/or other information. In some implementations, operation 210 may be performed by a processor component the same as or similar to the well operation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for estimating wellhead fatigue damage using metocean data, the system comprising:
one or more physical processors configured by machine-readable instructions to:
obtain metocean information, the metocean information characterizing metocean conditions for a wellhead, wherein a riser is connected to the wellhead and the metocean conditions for the wellhead include current profile for the wellhead and wave characteristics for the wellhead, further wherein the wave characteristics for the wellhead include peak wave period and significant wave height for the wellhead;
determine a wave-induced wellhead fatigue damage rate for the wellhead based on the metocean conditions for the wellhead;
determine a riser vortex-induced vibration caused wellhead fatigue damage rate for the wellhead based on the metocean conditions for the wellhead;
determine a total wellhead fatigue damage rate for the wellhead based on the wave-induced wellhead fatigue damage rate and the riser vortex-induced vibration caused wellhead fatigue damage rate;
determine an accumulated wellhead fatigue damage at the wellhead based on the total wellhead fatigue damage rate for the wellhead and a duration of time corresponding to the total wellhead fatigue damage rate for the wellhead;
compare the accumulated wellhead fatigue damage at the wellhead to an allowable fatigue damage limit for the wellhead; and
responsive to the accumulated wellhead fatigue damage at the wellhead exceeding the allowable fatigue damage limit for the wellhead, disconnect the riser from the wellhead.

2. The system of claim 1, wherein the allowable fatigue damage limit for the wellhead includes an operational fatigue limit for a given operation.

3. The system of claim 1, wherein the allowable fatigue damage limit for the wellhead includes a total fatigue limit for the life cycle of the wellhead.

4. The system of claim 1, wherein the wave-induced wellhead fatigue damage rate and the riser vortex-induced vibration caused wellhead fatigue damage rate are determined for a time corresponding to the metocean conditions for the wellhead.

5. The system of claim 4, wherein the time corresponding to the metocean conditions for the wellhead includes a historical time, a present time, or a future time.

6. The system of claim 1, wherein the metocean conditions for the wellhead are associated with probabilities, and
the total wellhead fatigue damage rate determined for the wellhead includes a probabilistic total wellhead fatigue damage rate.

7. The system of claim 1, wherein a wave-induced fatigue analysis is performed for the wellhead to predetermine values of the wave-induced wellhead fatigue damage rate for different sea states, the different sea states defined by different combinations of peak wave period and significant wave height.

8. The system of claim 7, wherein the wave-induced wellhead fatigue damage rate for the wellhead is determined based on a two-dimensional interpolation of the predetermined values of the wave-induced wellhead fatigue damage rate for a given sea state.

9. The system of claim 1, wherein a modal analysis is performed to predetermine natural frequencies and modal shapes of a riser connected to the wellhead, and the riser vortex-induced vibration caused wellhead fatigue damage rate for the wellhead is determined further based on the predetermined natural frequencies and the predetermined modal shapes of the riser connected to the wellhead.

10. The system of claim 9, wherein use of the predetermined natural frequencies and the predetermined modal shapes of the riser connected to the wellhead to determine the riser vortex-induced vibration caused wellhead fatigue damage rate for the wellhead reduces time and resources required to determine the riser vortex-induced vibration caused wellhead fatigue damage rate for the wellhead.

11. A method for estimating wellhead fatigue damage using metocean data, the method comprising:
obtaining metocean information, the metocean information characterizing metocean conditions for a wellhead, wherein a riser is connected to the wellhead and the metocean conditions for the wellhead include current profile for the wellhead and wave characteristics for the wellhead, further wherein the wave characteristics for the wellhead include peak wave period and significant wave height for the wellhead;
determining a wave-induced wellhead fatigue damage rate for the wellhead based on the metocean conditions for the wellhead;
determining a riser vortex-induced vibration caused wellhead fatigue damage rate for the wellhead based on the metocean conditions for the wellhead;
determining a total wellhead fatigue damage rate for the wellhead based on the wave-induced wellhead fatigue damage rate and the riser vortex-induced vibration caused wellhead fatigue damage rate;
determining an accumulated wellhead fatigue damage at the wellhead based on the total wellhead fatigue damage rate for the wellhead and a duration of time corresponding to the total wellhead fatigue damage rate for the wellhead;
comparing the accumulated wellhead fatigue damage at the wellhead to an allowable fatigue damage limit for the wellhead; and
responsive to the accumulated wellhead fatigue damage at the wellhead exceeding the allowable fatigue damage limit for the wellhead, disconnecting the riser from the wellhead.

12. The method of claim 11, wherein the allowable fatigue damage limit for the wellhead includes an operational fatigue limit for a given operation.

13. The method of claim 11, wherein the allowable fatigue damage limit for the wellhead includes a total fatigue limit for the life cycle of the wellhead.

14. The method of claim 11, wherein the wave-induced wellhead fatigue damage rate and the riser vortex-induced vibration caused wellhead fatigue damage rate are determined for a time corresponding to the metocean conditions for the wellhead.

15. The method of claim 14, wherein the time corresponding to the metocean conditions for the wellhead includes a historical time, a present time, or a future time.

16. The method of claim 11, wherein the metocean conditions for the wellhead are associated with probabilities, and the total wellhead fatigue damage rate determined for the wellhead includes a probabilistic total wellhead fatigue damage rate.

17. The method of claim 11, wherein a wave-induced fatigue analysis is performed for the wellhead to predetermine values of the wave-induced wellhead fatigue damage rate for different sea states, the different sea states defined by different combinations of peak wave period and significant wave height.

18. The method of claim 17, wherein the wave-induced wellhead fatigue damage rate for the wellhead is determined based on a two-dimensional interpolation of the predetermined values of the wave-induced wellhead fatigue damage rate for a given sea state.

19. The method of claim 11, wherein a modal analysis is performed to predetermine natural frequencies and modal shapes of a riser connected to the wellhead, and the riser vortex-induced vibration caused wellhead fatigue damage rate for the wellhead is determined further based on the predetermined natural frequencies and the predetermined modal shapes of the riser connected to the wellhead.

20. The method of claim 19, wherein use of the predetermined natural frequencies and the predetermined modal shapes of the riser connected to the wellhead to determine the riser vortex-induced vibration caused wellhead fatigue damage rate for the wellhead reduces time and resources required to determine the riser vortex-induced vibration caused wellhead fatigue damage rate for the wellhead.

\* \* \* \* \*